UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER AND PROCESS OF MAKING THE SAME.

No. 925,429.          Specification of Letters Patent.        Patented June 15, 1909.

Application filed March 13, 1908. Serial No. 420,808.

*To all whom it may concern:*

Be it known that I, CARLETON ELLIS, a citizen of the United States, and resident of Larchmont, county of Westchester, and State of New York, have made a certain new and useful Invention in Finish-Removers and Processes of Making the Same, of which the following is a specification.

This invention relates to finish removers and processes of making the same, and relates especially to removers prepared by the solution of a suitable acetate in alcohol or similar finish solvent material and the incorporation therewith of a suitable waxy body dissolved in a solvent therefor, sufficient acid being preferably added to the mixture to substantially neutralize the free alkali displaced from the acetate by esterification of the alcohol.

Acetates, such as metallic acetates including potassium, ammonium, sodium, magnesium and barium acetates, are quite soluble in methyl, ethyl and other alcohols and in other allied loosening finish solvent materials (that is, solvents of a generally alcoholic character or action in removers) such as the allied ketonic solvents, including methyl ethyl ketone, methyl acetone (that is, a composition containing about 40% of acetone, some wood alcohol and the balance higher ketones) and acetone. The solution may be readily effected by heating the alcoholic or similar solvent body in a reflux condenser in contact with an excess of the desired acetate or other salt capable of effecting esterification, the temperature being carried up to near the boiling point of the solvents used, or, if desired, the solution may take place in a digester preferably in the presence of an excess of the acetate, the pressure and temperature being carried up to any desired point to facilitate solution and the resulting esterification, although such increase of temperature is not always necessary to effect the desired conversion of the solvent material. In such a solution the alcohol, for instance, combines with the salt to form an ester and the base with which the acetic or other acid radical was combined is displaced to the corresponding extent, so that acetic or other esters are present in removers of this character and may add to the finish softening and solvent action thereof. Among other salts capable of effecting such esterification are other alcohol soluble salts preferably having organic acid radicals of the fatty or aromatic series, such as formates, propionates, butyrates, and so forth.

As an illustrative example, a suitable remover may be prepared by dissolving ten to twenty parts of potassium acetate in one hundred parts of methyl alcohol or in finish solvent material comprising a plurality of solvents, such, for example, as the composite solvent known as methyl acetone, in dissolving three parts of ceresin or other waxy or soapy material in one hundred parts of benzol or other wax solvent miscible with the alcoholic body and mixing the two solutions and gradually adding sufficient strong sulfuric acid while the mixture is thoroughly agitated in a suitable emulsifier or otherwise to substantially neutralize the alkalinity due to the esterification of the alcohol. This action gives a precipitation of sodium sulfate, the particles of which are agglomerated with the colloidal waxy material thrown down at the same time so as to give a very desirable stiffening material throughout the body of the remover.

Instead of the potassium acetate referred to five to ten parts of sodium or ammonium acetate may be used and other penetrating finish solvent material, that is, finish solvents having generally benzolic character or action in removers may be used in place of the benzol such penetrating solvents comprising toluol, xylol and other homologues, naphtha, benzene and other petroleum hydrocarbons, as well as turpentine, wood turpentine, terpineol, carbon-tetrachlorid and other chlorinated solvents.

Another illustrative remover may be prepared by forming a saturated solution of calcined sodium acetate in wood alcohol and similarly adding a substantially equal volume of benzol which forms a flaky precipitate. If desired, paraffin or ceresin wax may be first dissolved in the benzol so as to give two or three percent. of this waxy material in the finish remover. This, of course, gives an alkaline remover because of the presence of the displaced basic material and if desired a neutral remover may be prepared by the addition of the desired amount of suitable acid material, such as strong sulfuric or hydrochloric acid which may be incorporated by percolation of the dry acid gas, if desired.

This invention has been described in connection with a number of illustrative ingredients, formulas and proportions, to the details of which the invention is not, of course, to be limited.

What is claimed is:—

1. The process of preparing finish remover which consists in dissolving approximately 10 to 20 parts of potassium acetate in 100 parts of methyl acetone, in dissolving 3 parts of ceresin in 100 parts of benzol, in mixing the two solutions and agitating the mixture and gradually incorporating therewith sufficient strong sulfuric acid to substantially neutralize the alkalinity due to esterification.

2. The process of preparing finish remover which consists in dissolving potassium acetate in alcoholic finish solvent material, in incorporating therewith penetrating solvent material in which waxy stiffening material has been dissolved and in agitating the mixture and adding acid to substantially neutralize the developed alkalinity.

3. The process of making finish remover which consists in dissolving metallic acetate in loosening finish solvent material, in incorporating therewith finish solvent material and incorporated waxy stiffening material and in neutralizing the developed alkalinity.

4. The process of making finish remover which consists in dissolving potassium acetate in alcoholic material and thereby effecting esterification, in incorporating therewith penetrating finish solvent material miscible therewith and in neutralizing the alkalinity due to esterification.

5. The process of making finish remover which consists in dissolving a metallic, soluble salt of a fatty acid in alcoholic material and effecting esterification, in incorporating miscible finish solvent material therewith and in substantially neutralizing the developed alkalinity.

6. The process of making finish remover which consists in dissolving a metallic salt of a fatty acid in loosening finish solvent material including an aromatic solvent and in substantially neutralizing the developed alkalinity.

7. The process of preparing finish remover which consists in dissolving potassium acetate in alcoholic finish solvent material and in incorporating therewith penetrating solvent material in which waxy stiffening material has been dissolved.

8. The process of making finish remover which consists in dissolving a metallic acetate in loosening finish solvent material and in incorporating therewith finish solvent material and incorporated waxy stiffening material.

9. The process of making finish remover which consists in dissolving potassium acetate in alcoholic material and thereby effecting esterification and in incorporating therewith penetrating finish solvent material miscible therewith.

10. The process of making finish remover which consists in dissolving metallic acetate material and effecting esterification and in incorporating miscible finish solvent material therewith.

11. The process of making finish remover which consists in dissolving a metallic salt of a fatty acid in loosening finish solvent material including an aromatic solvent.

12. The finish remover formed by dissolving approximately 10 to 20 parts of potassium acetate in 100 parts of methyl alcohol, in mixing therewith 100 parts of benzol in which 3 parts of ceresin wax have been dissolved and in adding sufficient strong sulfuric acid to substantially neutralize the developed alkalinity while agitating the mixture.

13. The finish remover formed by dissolving approximately 10 to 20 parts of potassium acetate in 100 parts of alcoholic finish solvent material, in combining therewith 100 parts of penetrating finish solvent material in which waxy stiffening material has been incorporated and adding acid to the mixture to substantially neutralize the developed alkalinity.

14. The finish remover comprising approximately potassium acetate dissolved in alcoholic finish solvent material to effect esterification with which an approximately equal volume of aromatic finish solvent material has been incorporated and acid material added to substantially neutralize the developed alkalinity.

15. The finish remover comprising alcoholic finish solvent material in which a metallic salt of a fatty acid has been dissolved to effect esterification and miscible penetrating finish solvent incorporated therewith.

16. The finish remover comprising approximately loosening finish solvent material in which a metallic salt of an organic acid has been dissolved to effect esterification and miscible finish solvent material incorporated therewith.

17. The finish remover comprising an approximately saturated solution of a metallic acetate in alcoholic finish solvent material to effect esterification and aromatic finish solvent material incorporated therewith.

18. The finish remover comprising a plurality of finish solvents including an alcoholic body and a metallic salt dissolved therein to effect esterification and finish solvent material and incorporated stiffening material combined therewith.

19. The finish remover comprising a plurality of finish solvents including an alcoholic body in which a metallic organic salt has been dissolved to effect esterification and aromatic finish solvent material incorporated therewith.

20. The finish remover comprising a plurality of finish solvents including an alcoholic body in which a metallic salt has been dissolved to effect esterification.

21. The process of making finish remover which consists in dissolving a metallic acetate in a plurality of finish solvents including an alcoholic body and effecting esterification and in incorporating penetrating finish solvent material and stiffening material therewith.

22. The process of making finish remover which consists in incorporating a soluble metallic salt in a plurality of finish solvents including an alcoholic body and thereby effecting esterification and in combining therewith additional finish solvent material.

23. The process of making finish remover which consists in incorporating with volatile finish solvent material, including methyl alcohol, potassium acetate and sulfuric acid to effect esterification.

24. The process of making finish remover, which consists in incorporating a metallic acetate in a plurality of finish solvents, including an alcoholic body and effecting condensation.

25. The process of making finish remover which consists in incorporating an acetate of an alkali in a plurality of finish solvents including an alcoholic body, and effecting condensation of such solvents.

26. The process of making finish remover which consists in incorporating with volatile finish solvent material including an alcohol, a metallic acetate and an acid to effect esterification.

27. The process of making finish remover which consists in incorporating a metallic acetate and acid with finish solvent material, including an alcoholic body to effect esterification.

28. The process of making finish remover which consists in incorporating a metallic acetate and a stronger acid with finish softening material including an alcoholic body to effect condensation.

29. The process of making finish remover which consists in incorporating an organic salt of a metal and a stronger acid with finish softening material and effecting condensation.

30. The process of making finish remover which consists in incorporating a metallic fatty acid salt and a stronger mineral acid with composite finish softening material and effecting condensation.

31. The finish remover comprising a plurality of finish softening agents including an alcoholic body in which a metallic salt and a stronger acid have been incorporated to effect condensation.

32. The finish remover comprising finish softening material with which a metallic fatty acid salt and a stronger acid have been incorporated to effect condensation.

33. The finish remover comprising composite finish softening material with which a metallic fatty acid salt and a stronger acid have been incorporated and condensation effected.

34. The finish remover comprising composite finish softening material with which a metallic fatty acid salt and a stronger mineral acid have been incorporated to effect condensation.

CARLETON ELLIS.

Witnesses:
HARRY L. DUNCAN,
JESSIE B. KAY.